(12) United States Patent
Miyagawa et al.

(10) Patent No.: US 11,480,084 B2
(45) Date of Patent: Oct. 25, 2022

(54) CO2 RECOVERY SYSTEM

(71) Applicant: TOYOTA JIDOSHA KABUSHIKI KAISHA, Aichi-ken (JP)

(72) Inventors: Jun Miyagawa, Numazu (JP); Daiki Yokoyama, Gotemba (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 322 days.

(21) Appl. No.: 16/885,274

(22) Filed: May 28, 2020

(65) Prior Publication Data
US 2020/0391575 A1   Dec. 17, 2020

(30) Foreign Application Priority Data

Jun. 11, 2019   (JP) .............................. JP2019-109015

(51) Int. Cl.
| | | |
|---|---|---|
| *F01N 3/08* | (2006.01) | |
| *B01D 53/62* | (2006.01) | |
| *F01N 9/00* | (2006.01) | |
| *G06V 20/59* | (2022.01) | |
| *B60H 3/06* | (2006.01) | |

(52) U.S. Cl.
CPC ........... *F01N 3/0857* (2013.01); *B01D 53/62* (2013.01); *F01N 9/00* (2013.01); *G06V 20/597* (2022.01); *B60H 2003/0691* (2013.01); *F01N 2560/022* (2013.01); *F01N 2900/12* (2013.01); *F01N 2900/1402* (2013.01)

(58) Field of Classification Search
CPC .................................................... F01N 3/0857
See application file for complete search history.

(56) References Cited

U.S. PATENT DOCUMENTS

| | | | | |
|---|---|---|---|---|
| 2009/0312905 | A1* | 12/2009 | Marra ................ | B60H 1/00849 700/276 |
| 2013/0298761 | A1 | 11/2013 | Hamad | |
| 2013/0333406 | A1 | 12/2013 | Takahashi | |
| 2013/0333638 | A1 | 12/2013 | Nishida et al. | |
| 2019/0160418 | A1* | 5/2019 | Matsumoto .......... | B01D 53/261 |
| 2020/0030738 | A1* | 1/2020 | Smith .................. | B60H 3/0633 |

FOREIGN PATENT DOCUMENTS

| | | | |
|---|---|---|---|
| CN | 103402795 A | | 11/2013 |
| CN | 105114213 A | | 12/2015 |
| JP | 2014504695 A | | 2/2014 |
| JP | 2017206145 A | | 11/2017 |
| KR | 20140038717 A | * | 3/2014 |
| KR | 20140114237 A | * | 9/2014 |
| WO | 2012120641 A1 | | 9/2012 |

OTHER PUBLICATIONS

Machine translation of KR-20140038717-A accessed Jun. 10, 2022. (Year: 2022).*

* cited by examiner

*Primary Examiner* — Jonathan R Matthias
(74) *Attorney, Agent, or Firm* — Hauptman Ham, LLP (57) ABSTRACT

A $CO_2$ recovery system used in a vehicle includes a $CO_2$ recovery device recovering $CO_2$ contained in inflowing gas; and a flow rate control device controlling flow rates of gases present in a plurality of different regions of the vehicle flowing into the $CO_2$ recovery device. The gases present at the plurality of different regions include at least any two among air at an outside of the vehicle, air at an inside of the vehicle, and exhaust gas discharged from a body of an internal combustion engine of the vehicle.

9 Claims, 7 Drawing Sheets

CO2 RECOVERY SYSTEM

RELATED APPLICATIONS

The present application claims priority of Japanese Patent Application No. 2019-109015, filed Jun. 11, 2019, the disclosure of which is hereby incorporated by reference herein in its entirety.

FIELD

The present disclosure relates to a $CO_2$ recovery system.

BACKGROUND

Known in the past has been a $CO_2$ recovery system used for a vehicle having a $CO_2$ recovery device recovering $CO_2$ contained in inflowing exhaust gas (for example, PTL 1). In particular, in the $CO_2$ recovery system described in PTL 1, the exhaust gas discharged from an internal combustion engine mounted in a vehicle is supplied to the $CO_2$ recovery device, and as a result the $CO_2$ in the exhaust gas is recovered by the $CO_2$ recovery device.

CITATIONS LIST

Patent Literature

[PTL 1] JP 2014-504695 A

SUMMARY

Technical Problem $CO_2$ is contained not only in the exhaust gas, but also in the air at the outside of a vehicle or the air at the inside of a vehicle. Therefore, it may also be considered to recover the $CO_2$ in the air at the inside of and outside of a vehicle. However, in the $CO_2$ recovery system described in PTL 1, nothing other than the exhaust gas of the internal combustion engine was supplied to the $CO_2$ recovery device. Accordingly, it was not possible to recover $CO_2$ from the air at the inside of and outside of the vehicle.

In view of the above technical problem, an object of the present disclosure is to provide a $CO_2$ recovery system able to recover $CO_2$ in gases present in a plurality of different regions of the vehicle.

Solution to Problem

The present invention has as its gist the following.

(1) A $CO_2$ recovery system used in a vehicle, comprising:
a $CO_2$ recovery device recovering $CO_2$ contained in inflowing gas; and
a flow rate control device controlling flow rates of gases present in a plurality of different regions of the vehicle flowing into the $CO_2$ recovery device,
wherein the gases present at the plurality of different regions include at least any two among air at an outside of the vehicle, air at an inside of the vehicle, and exhaust gas discharged from a body of an internal combustion engine of the vehicle.

(2) The $CO_2$ recovery system according to above (1), wherein the flow rate control device controls the flow rate of air at the outside of the vehicle flowing into the $CO_2$ recovery device, based on a $CO_2$ concentration in the air at the outside of the vehicle.

(3) The $CO_2$ recovery system according to above (1) or (2), wherein the flow rate control device controls the flow rate of air at the inside of the vehicle flowing into the $CO_2$ recovery device, based on a $CO_2$ concentration in the air at the inside of the vehicle.

(4) The $CO_2$ recovery system according to any one of above (1) to (3), wherein
the flow rate control device has a switching device arranged at an upstream side of the $CO_2$ recovery device in a direction of flow of the gas and a pump forcibly sending gases from a plurality of different regions through the switching device to the $CO_2$ recovery device, and
the switching device switches the gas to be flowed to the $CO_2$ recovery device among the gases present in the plurality of different regions.

(5) The $CO_2$ recovery system according to above (4), wherein
the vehicle has an internal combustion engine having the body of the internal combustion engine and an exhaust passage through which exhaust gas discharged from the body of the internal combustion engine flows,
the gases present at the plurality of different regions include exhaust gas discharged from the body of the internal combustion engine, and
the switching device communicates with the exhaust passage so that exhaust gas can flow to the switching device from the exhaust passage.

(6) The $CO_2$ recovery system according to above (5), wherein
a first connection passage communicating the exhaust passage with the switching device is provided with a cooling device cooling the gas, and
a second connection passage communicating an outside of the vehicle with the switching device and a third connection passage communicating an inside of the vehicle with the switching device are not provided with cooling devices.

(7) The $CO_2$ recovery system according to above (5), wherein a communication path communicating the switching device with the $CO_2$ recovery device is provided with a cooling device cooling gas flowing through the communication path.

(8) The $CO_2$ recovery system according to any one of above (5) to (7), wherein the flow rate control device controls the flow rate of the exhaust gas, which is discharged from the body of the internal combustion engine, flowing into the $CO_2$ recovery device, based on the $CO_2$ concentration in the exhaust gas flowing through the exhaust passage.

(9) The $CO_2$ recovery system according to any one of above (5) to (8), wherein the flow rate control device is controlled so that when the internal combustion engine is stopped, at least one of air at the outside of the vehicle and air at the inside of the vehicle, flows into the $CO_2$ (10) The $CO_2$ recovery system according to any one of above (4) to (9), wherein when the flow rate control device is controlled so that air at the outside of the vehicle flows into the $CO_2$ recovery device, the pump is controlled so that an output of the pump decreases, as the a running speed of the vehicle becomes faster.

(11) The $CO_2$ recovery system according to any one of above (1) to (10), wherein
the system further comprises an awakeness degree detection device for detecting a degree of awakeness of a driver, the CO₂ recovery device is configured to be able to return gas discharged from the $CO_2$ recovery device to the inside of the vehicle, and when a degree of awakeness of the driver is lower than a predetermined threshold value, the flow rate control device is controlled so that the air at the inside of the vehicle flows into the $CO_2$ recovery device and the gas discharged from the $CO_2$ recovery device is returned to the inside of the vehicle.

Advantageous Effects of Invention

According to the present disclosure, there is provided a $CO_2$ recovery system able to recover $CO_2$ in gases present in a plurality of different regions of the vehicle.

BRIEF DESCRIPTION OF DRAWINGS

Below, referring to the drawings, an embodiment will be explained in detail. Note that, in the following explanation, similar component elements are assigned the same reference signs.

First Embodiment

Configuration of Vehicle

Figure 1:
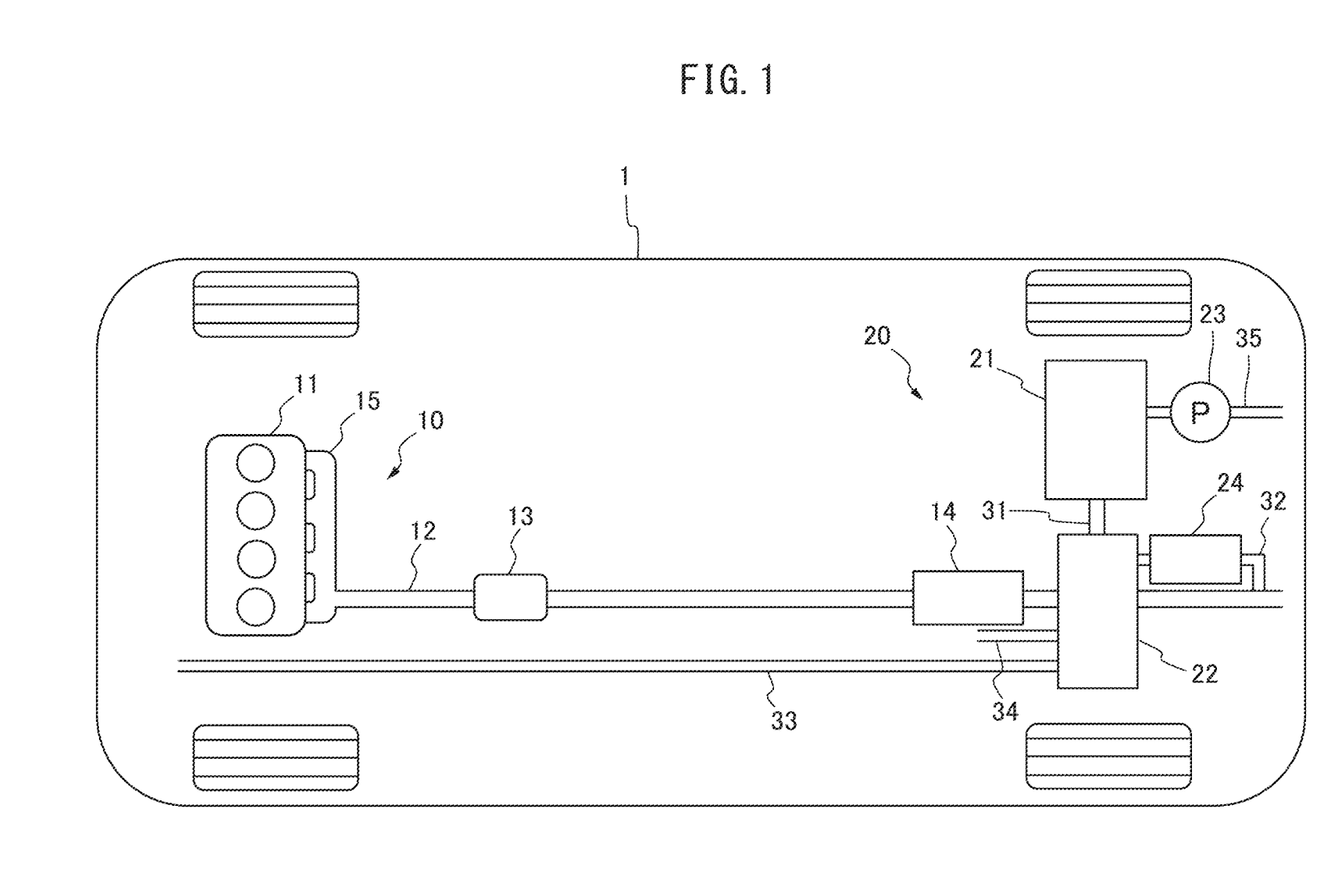
FIG. 1 is a plan view schematically showing a vehicle having a $CO_2$ recovery system according to one embodiment.
Figure 2:
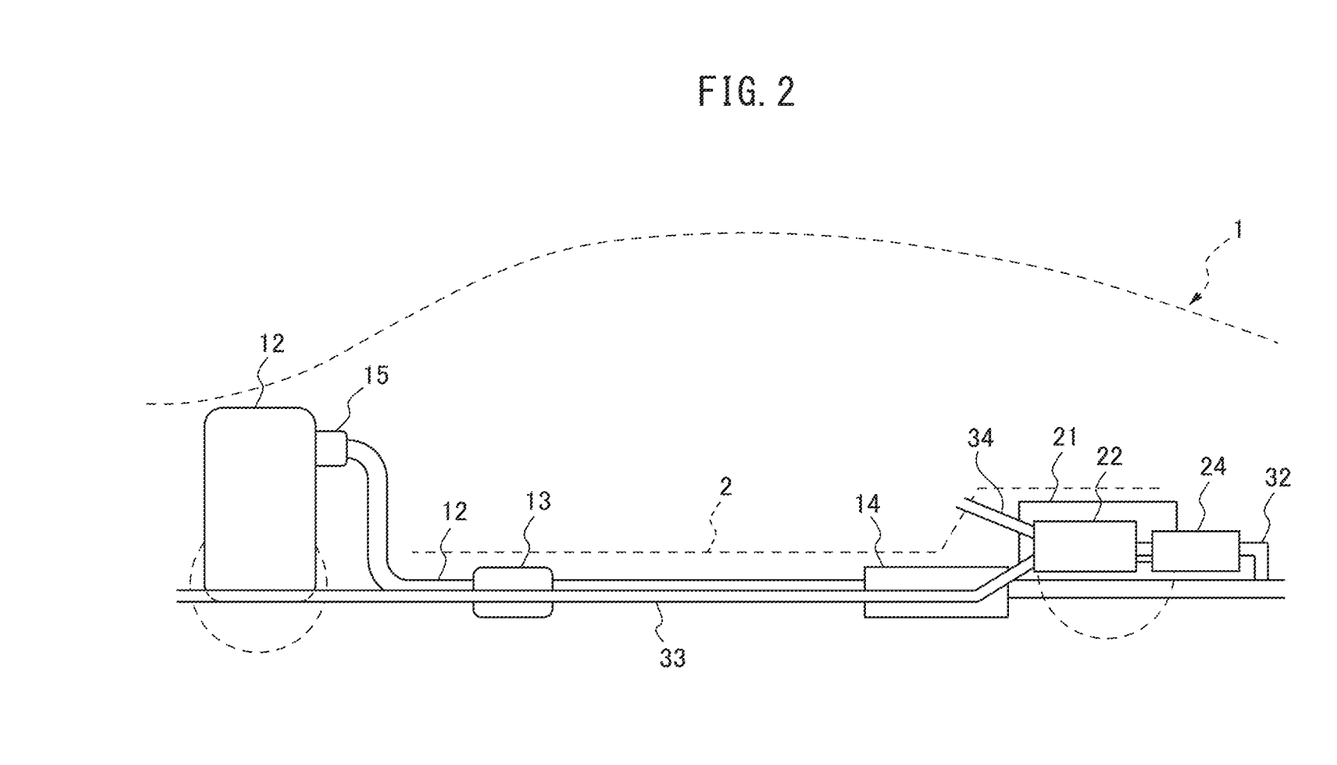
FIG. 2 is a side view schematically showing a vehicle having a $CO_2$ recovery system according to one embodiment.

Referring to FIGS. 1 and 2, a vehicle mounting a $CO_2$ recovery system according to one embodiment will be explained. FIG. 1 is a plan view schematically showing a vehicle 1 having a $CO_2$ recovery system according to the embodiment. FIG. 2 is a side view schematically showing a vehicle 1 having this $CO_2$ recovery system.

As shown in FIGS. 1 and 2, the vehicle 1 has an internal combustion engine 10 for driving the vehicle 1 and a $CO_2$ recovery system 20 for recovering $CO_2$. Note that, in the present embodiment, the internal combustion engine 10 is used as the power source for driving the vehicle 1, but an electric motor may be used as the power source for driving the vehicle 1 in addition to the internal combustion engine 10 or instead of the internal combustion engine 10.

The internal combustion engine 10 has an engine body 11, exhaust pipe 12, exhaust purification device 13, and muffler 14. The engine body 11 is arranged in an engine compartment formed at the front of the vehicle 1 (left side of FIGS. 1 and 2). The exhaust pipe 12 mainly extends under an underbody 2 of the vehicle 1 from the engine body 11 toward the back of the vehicle 1 in the front-back direction of the vehicle 1. The exhaust purification device 13 and muffler 14 are provided at the exhaust pipe 12.

The engine body 11 generates power for driving the vehicle 1 by burning fuel at the inside. The exhaust gas generated due to combustion of fuel in the engine body 11 flows into the exhaust pipe 12.

The exhaust pipe 12 is connected through an exhaust manifold 15 to the engine body 11. The exhaust gas discharged from the engine body 11 flows through the inside of the exhaust pipe 12. From the outlet of the exhaust pipe 12, exhaust gas is released to the atmosphere. The exhaust pipe 12 forms an exhaust passage through which exhaust gas discharged from the engine body 11 flows.

The exhaust purification device 13 purifies the NOx, HC (hydrocarbons), CO, particulate, and other substances in the exhaust gas flowing into the exhaust purification device 13. The exhaust purification device 13 is, for example, a three-way catalyst, a NOx storage reduction catalyst, or a particulate filter. Note that, a plurality of exhaust purification devices 13 may also be provided at the exhaust pipe 12.

The muffler 14 causes the temperature and pressure of the exhaust gas flowing through the exhaust pipe 12 to decrease, to reduce the exhaust noise. The muffler 14 is arranged at the downstream side of the exhaust purification device 13 in the downstream direction of the exhaust gas. Note that, a plurality of the mufflers 14 may also be provided at the exhaust pipe 12.

Configuration of $CO_2$ Recovery System

The $CO_2$ recovery system 20 has a $CO_2$ recovery device 21, flow path switching device 22, suction pump 23, and cooling device 24.

The $CO_2$ recovery device 21 is a device for recovering the $CO_2$ in the gas supplied to the $CO_2$ recovery device 21. In the present embodiment, the $CO_2$ recovery device is arranged in or below luggage space positioned at the back of the vehicle 1. Note that, the $CO_2$ recovery device 21 is a heavy object, therefore it is preferable to arrange it as low as possible in the vertical direction in the luggage space.

The method of recovery of $CO_2$ in the gas by the $CO_2$ recovery device 21 may be, for example, the physical adsorption method, physical absorption method, chemical absorption method, cryogenic separation method, etc.

The physical adsorption method, for example, is a method of bringing activated carbon, zeolite, or other solid adsorbent into contact with a gas containing $CO_2$ to thereby make the $CO_2$ be adsorbed at the solid adsorbent, and heating (or reducing the pressure) to thereby make the $CO_2$ be desorbed from the solid adsorbent.

When employing the physical adsorption method, the $CO_2$ recovery device 21 is, for example, configured as a container holding pellet shaped zeolite. By making the gas containing $CO_2$ flow through the container, the $CO_2$ is adsorbed by the zeolite.

The physical absorption method is a method of making an absorption solution, which is able to dissolve the $CO_2$ (for example methanol or N-methyl pyrrolidone), contact the gas containing $CO_2$ to physically make the $CO_2$ be absorbed at a high pressure and low temperature, and heating (or reducing the pressure) the absorption solution to recover the $CO_2$ from it.

When employing the physical absorption method, the $CO_2$ recovery device 21 is, for example, configured as a container containing methanol. By making the gas containing $CO_2$ flow through the methanol held in the container, the $CO_2$ is absorbed by the methanol.

The chemical absorption method is a method of making an absorption solution, which is able to selectively dissolve the $CO_2$ (for example, amine or a potassium carbonate aqueous solution), contact the gas containing $CO_2$ to make the $CO_2$ be absorbed in the absorption solution by a chemical reaction, and heating it thereby making the $CO_2$ be desorbed from the absorption solution.

When employing the chemical absorption method, the $CO_2$ recovery device 21 is, for example, configured as a container holding amine. By making the gas containing $CO_2$ flow through the inside of the amine held in the container, the $CO_2$ is absorbed by the amine.

In the present embodiment, in the $CO_2$ recovery device 21, the physical adsorption method is employed as the method of recovery of the $CO_2$ in the exhaust. Therefore, the $CO_2$ recovery device 21 is configured as a container holding pellet shaped zeolite.

The flow path switching device 22 is a device switching the type of the gas flowing into the $CO_2$ recovery device 21. In the present embodiment, the flow path switching device 22 is arranged in or below luggage space positioned at the back of the vehicle 1.

Figure 3:
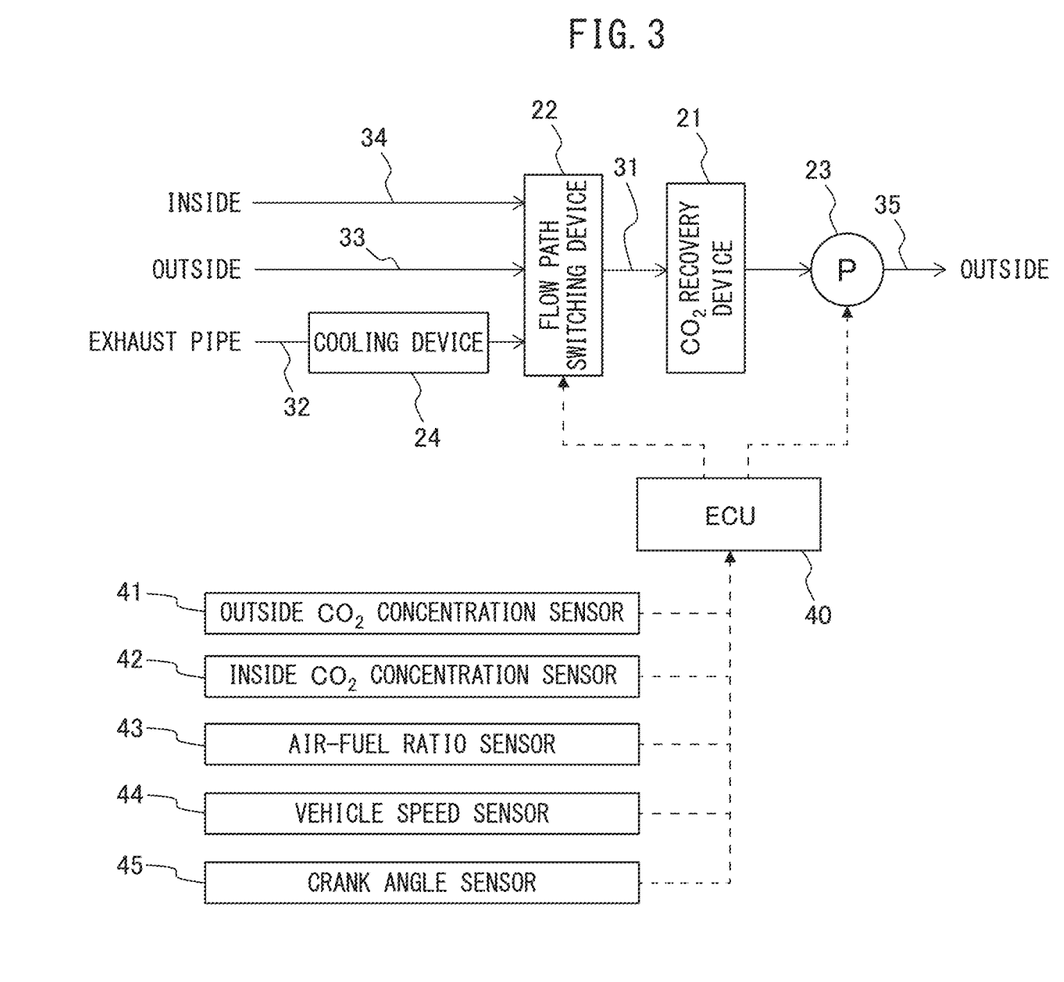
FIG. 3 is a view schematically explaining the configuration of a $CO_2$ recovery system.

The flow path switching device 22 communicates through a communication path 31 with the $CO_2$ recovery device 21. Therefore, the gas flowing out from the flow path switching device 22 flows through the communication path 31 into the $CO_2$ recovery device 21. In other words, the flow path switching device 22 is arranged at the upstream side of the $CO_2$ recovery device 21 in the direction of flow of gas.

Further, the flow path switching device 22 communicates through an exhaust pipe connection passage 32 with the exhaust pipe 12. In particular, the exhaust pipe connection passage 32 communicates with the exhaust pipe 12 at the downstream side from the muffler 14 in the direction of flow of exhaust gas. Therefore, the exhaust pipe connection passage 32 is configured so that exhaust gas can flow from the exhaust pipe 12 to the flow path switching device 22. In particular, since the exhaust pipe connection passage 32 communicates with the exhaust pipe 12 at the downstream side from the muffler 14, relatively low temperature exhaust gas flows into the exhaust pipe connection passage 32. Note that, in the present embodiment, the exhaust pipe connection passage 32 communicates with the exhaust pipe 12 at the downstream side from the muffler 14, but it may communicate with it upstream from the muffler 14 and may also communicate with it upstream from the exhaust purification device 13.

In addition, the flow path switching device 22 communicates through an outside connection passage 33 with the outside of the vehicle 1. In the present embodiment, the outside connection passage 33 extends below the underbody 2 of the vehicle 1 from the flow path switching device 22 to the front of the vehicle 1 in the front-back direction of the vehicle 1. In particular, in the present embodiment, the inlet of the outside connection passage 33 is arranged in the engine compartment. Therefore, the outside connection passage 33 is configured to enable the outside air around the vehicle 1 to flow from outside of the vehicle 1 to the flow path switching device 22. Note that, if able to make the air at the outside of the vehicle 1 flow through the outside connection passage 33 to the flow path switching device 22, the outside connection passage 33 may be configured in any way. Therefore, for example, the inlet of the outside connection passage 33 may be arranged at a lateral surface of the vehicle 1 (surface extending in front-back direction of vehicle 1).

Furthermore, the flow path switching device 22 communicates through an inside connection passage 34 with the inside of the vehicle 1. In the present embodiment, the inside connection passage 34 extends from the flow path switching device 22 toward the front of the vehicle 1 in the front-back direction of the vehicle 1. In particular, in the present embodiment, the inlet of the inside connection passage 34 is arranged near a back seat of the vehicle 1 at the inside of the vehicle 1. Therefore, the inside connection passage 34 is configured so that it is possible to make the air at the inside of the vehicle 1 flow from inside of the vehicle 1 to the flow path switching device 22. Note that, if able to make the air at the inside of the vehicle 1 flow through the inside connection passage 34 to the flow path switching device 22, the inside connection passage 34 may be configured in any way. Therefore, for example, the inlet of the inside connection passage 34 may be arranged at the front of the inside of the vehicle 1.

The flow path switching device 22 is configured to switch the passage communicating with the communication path 31 among the exhaust pipe connection passage 32, outside connection passage 33, and inside connection passage 34. Therefore, the flow path switching device 22 is configured to switch the gas to be flowed into the $CO_2$ recovery device 21 among the exhaust gas discharged from the engine body 11, the air at the outside of the vehicle 1, and the air at the inside of the vehicle 1. Specifically, the flow path switching device 22 is, for example, a four-way valve. In the present embodiment, the flow path switching device 22 makes one passage among the exhaust pipe connection passage 32, outside connection passage 33, and inside connection passage 34 selectively communicate with the communication path 31. Therefore, in the present embodiment, the flow path switching device 22 makes one of the exhaust gas discharged from the engine body 11, the air at the outside of the vehicle 1, and the air at the inside of the vehicle 1, selectively flow into the $CO_2$ recovery device 21.

Note that, in the present embodiment, the flow path switching device 22 is communicated with the exhaust pipe connection passage 32, outside connection passage 33, and inside connection passage 34. However, the flow path switching device 22 may also be configured to communicate with any two of these passages. Therefore, the flow path switching device is configured so as to switch the gas to be flowed into the $CO_2$ recovery device 21 between two gases among the exhaust gas discharged from the engine body 11, the air at the outside of the vehicle 1, and the air at the inside of the vehicle 1.

Further, in the present embodiment, the flow path switching device 22 is configured so that one passage among the exhaust pipe connection passage 32, outside connection passage 33, and inside connection passage 34 is made to selectively communicate with the communication path 31. However, the flow path switching device 22 may also be configured to change the ratio of the flow rate of gases flowing from a plurality of passages 32, 33, 34 to the communication path 31. In this case, the flow path switching device 22 is configured as solenoid adjustment valves changing in opening area, which are provided at the passages 32, 33, and 34.

The suction pump 23 is provided at the exhaust passage 35 communicated with the $CO_2$ recovery device 21. The exhaust passage 35 is configured so as to discharge gas after recovery of $CO_2$ at the $CO_2$ recovery device 21 into the atmosphere.

The suction pump 23 is configured so as to suck in gas from the $CO_2$ recovery device 21. In other words, the suction pump 23 is configured so as to forcibly send gas from the exhaust pipe 12, inside of the vehicle 1, and outside of the vehicle 1, through the flow path switching device 22 to the $CO_2$ recovery device 21. Further, the suction pump 23 is configured so as to be able to change the output. If the output of the suction pump 23 becomes larger, the flow rate of the gas flowing through the $CO_2$ recovery device 21 becomes greater.

In the present embodiment, the flow path switching device 22 and suction pump 23 function as a flow rate control device controlling the flow rates of gases present in a plurality of different regions of the vehicle 1 (for example, at least any two of air at the outside of the vehicle 1, air at the inside of the vehicle 1, and exhaust gas discharged from the engine body 11) into the $CO_2$ recovery device 21.

The cooling device 24 is provided in the exhaust pipe connection passage 32 and cools the exhaust gas flowing through the exhaust pipe connection passage 32. Further, the cooling device 24 is not provided at the outside connection passage 33 and inside connection passage 34.

The cooling device 24 is, for example, configured as a refrigeration circuit having a compressor, condenser, expansion valve, and evaporator. In the cooling device 24, a refrigeration cycle is realized by a refrigerant circulating through these component parts. In particular, the evaporator performs heat exchange with the exhaust gas flowing through the exhaust pipe connection passage 32 either directly or indirectly through a medium so as to cool this exhaust gas. The temperature of the refrigerant at the refrigeration circuit falls to a temperature lower than the temperature of the atmosphere, therefore in the present embodiment, the cooling device 24 can make the temperature of the exhaust gas flowing into the $CO_2$ recovery device 21 fall to a temperature lower than the temperature of the atmosphere (ordinary temperature).

Note that, the cooling device 24 does not necessarily have to be configured as a refrigeration circuit. The cooling device 24 may be configured in any way so long as cooling the exhaust gas flowing through the exhaust pipe connection passage 32. Therefore, for example, the cooling device 24 has a radiator of the vehicle 1 and is configured to cool the exhaust gas flowing through the exhaust pipe connection passage 32 by the coolant cooled at the radiator.

Further, in the present embodiment, the cooling device 24 is provided at the exhaust pipe connection passage 32. However, the cooling device 24 may be provided at the communication path 31. In this case, the cooling device 24 can cool not only just the exhaust gas flowing through the exhaust pipe connection passage 32, but also all of the gases flowing into the $CO_2$ recovery device 21. Further, the cooling device 24 may be arranged around the $CO_2$ recovery device 21 and configured to cool the $CO_2$ recovery device 21.

FIG. 3 is a view schematically explaining the configuration of the $CO_2$ recovery system 20. As shown in FIG. 3, the $CO_2$ recovery system 20 has an ECU 40. The ECU 40 has a processor for performing various processing, a memory storing a program and various information, and an interface connected to various actuators and various sensors.

Further, the $CO_2$ recovery system 20 has various sensors. Specifically, the $CO_2$ recovery system 20 has an outside $CO_2$ concentration sensor 41, inside $CO_2$ concentration sensor 42, air-fuel ratio sensor 43, vehicle speed sensor 44, and crank angle sensor 45.

The outside $CO_2$ concentration sensor 41 is provided at the outside of the vehicle 1 and detects the concentration of $CO_2$ in the air (atmosphere) at the outside of the surroundings of the vehicle 1. The inside $CO_2$ concentration sensor 42 is provided at the inside of the vehicle 1 and detects the concentration of $CO_2$ in the air at the inside. The air-fuel ratio sensor 43 is provided at the exhaust pipe 12 and detects the air-fuel ratio of the exhaust gas flowing through the exhaust pipe 12. The vehicle speed sensor 44 is provided around an axle of the vehicle 1 and detects the speed of the vehicle 1 based on the rotational speed of the axle. The crank angle sensor 45 detects the rotational angle of the crankshaft of the internal combustion engine 10.

Further, the ECU 40 is connected to various actuators of the $CO_2$ recovery system 20 and controls these actuators. Specifically, the ECU 40 is connected to the flow path switching device 22, suction pump 23, and cooling device 24 and controls them.

Flow of Gas at $CO_2$ Recovery System

In the $CO_2$ recovery system 20 configured as above, when the flow path switching device 22 is set so that the communication path 31 communicates with the inside connection passage 34 and the suction pump 23 is operating, the air at the inside of the vehicle 1 is supplied to the $CO_2$ recovery device 21.

On the other hand, when the flow path switching device 22 is set so that the communication path 31 communicates with the outside connection passage 33 and the suction pump 23 is operating, the air at the outside of the vehicle 1 is supplied to the $CO_2$ recovery device. Note that, when the flow path switching device 22 is set in this way, even if the suction pump 23 is not being operated, if the vehicle 1 is running, air at the outside of the vehicle 1 is supplied to the $CO_2$ recovery device 21.

Furthermore, when the flow path switching device 22 is set so that the communication path 31 communicates with the exhaust pipe connection passage 32 and the suction pump 23 is operating, the exhaust gas flowing through the exhaust pipe 12 is supplied to the $CO_2$ recovery device 21. Note that, when the flow path switching device 22 is set in this way, even if the suction pump 23 is not operating, only a small amount of exhaust gas is supplied to the $CO_2$ recovery device 21.

Further, if the exhaust gas flowing through the exhaust pipe 12 is high in temperature, the exhaust gas is cooled by the cooling device 24 before flowing into the $CO_2$ recovery device 21, by the cooling device 24 being operated. For this reason, low temperature exhaust gas is made to flow to the $CO_2$ recovery device 21.

Control of $CO_2$ Recovery System

Next, referring to FIGS. 4 and 5, control at the $CO_2$ recovery system 20 will be explained.

The concentration of $CO_2$ contained in the exhaust gas discharged from the engine body 11 is usually far higher than the concentration of $CO_2$ in the air at the inside of the vehicle 1 and outside of the vehicle 1 (atmosphere). Further, the amount of recovery of $CO_2$ at the $CO_2$ recovery device 21 per unit gas flow rate becomes greater, as the concentration of $CO_2$ in the gas becomes higher.

Therefore, in the present embodiment, while the internal combustion engine 10 is operating, the flow path switching device 22 is set to the exhaust pipe connection position making the communication path 31 communicate with the exhaust pipe connection passage 32. As a result, while the internal combustion engine 10 is operating, the exhaust gas flows through the exhaust pipe connection passage 32 to the $CO_2$ recovery device 21.

Further, the exhaust gas flowing through the exhaust pipe 12 is high in temperature. As explained above, if zeolite becomes high in temperature, it makes the adsorbed $CO_2$ be desorbed. Therefore, if high temperature exhaust gas flows as is to the $CO_2$ recovery device 21, the $CO_2$ recovery device 21 becomes high in temperature and the recovered $CO_2$ is desorbed from the $CO_2$ recovery device 21.

Such a situation can occur even when a solid absorbent other than zeolite or another method is used for recovering the $CO_2$. For example, even when using the physical absorption method or the chemical absorption method, the $CO_2$ is separated from the absorption solution by heating as explained above. Therefore, in such a case as well, if high temperature exhaust gas flows into the $CO_2$ recovery device 21, the recovered $CO_2$ is desorbed from the $CO_2$ recovery device 21.

Therefore, in the present embodiment, when making exhaust gas flow through the exhaust pipe connection passage 32 into the $CO_2$ recovery device 21, the cooling device 24 is made to operate. Due to this, exhaust gas is cooled before flowing into the $CO_2$ recovery device 21. Accordingly, the $CO_2$ recovery device 21 is kept from becoming high in temperature and accordingly the recovered $CO_2$ is kept from being desorbed from the $CO_2$ recovery device 21.

On the other hand, while the internal combustion engine 10 is stopped, no exhaust gas is discharged from the engine body 11. Therefore, there is no need to supply gas in the exhaust pipe 12 to the $CO_2$ recovery device 21. Therefore, in the present embodiment, while the internal combustion engine 10 is stopped, the flow path switching device 22 is set to either of the outside connection position making the communication path 31 communicate with the outside connection passage 33 or of the inside connection position making the communication path 31 communicate with the inside connection passage 34.

Note that, if the flow path switching device 22 is configured so as to be able to connect the communication path 31 to a plurality of passages, while the internal combustion engine 10 is stopped, the communication path 31 may be communicated with both of the outside connection passage 33 and inside connection passage 34. Therefore, the flow path switching device 22 is controlled so that while the internal combustion engine 10 is stopped, at least one of the air at the outside of the vehicle 1 and the air at the inside of the vehicle 1 flows into the $CO_2$ recovery device 21.

In particular, in the present embodiment, while the internal combustion engine 10 is stopped, the flow path switching device 22 is controlled so that the air with the higher $CO_2$ concentration among the air at the outside and the air at the inside, is supplied to the $CO_2$ recovery device 21. Therefore, when the $CO_2$ concentration in the air at the outside is high, the flow path switching device 22 is set to the outside connection position, while when the $CO_2$ concentration in the air at the inside is high, the flow path switching device 22 is set to the inside connection position. As a result, the $CO_2$ recovery device 21 is supplied with air with a high $CO_2$ concentration, and accordingly the recovery efficiency of the $CO_2$ can be raised. On the other hand, when the internal combustion engine 10 is stopped and the $CO_2$ concentration in the air at the outside and the $CO_2$ concentration in the air at the inside are substantially equal, the flow path switching device 22 is set to the outside connection position.

Next, referring to FIG. 4, control of the output of the suction pump 23 will be explained. FIG. 4 is a view showing a relationship between pump work performed by a suction pump 23 and an amount of $CO_2$ reduction. The amount of $CO_2$ reduction shows the amount of $CO_2$ recovered by the $CO_2$ recovery device 21 per unit time minus the amount of $CO_2$ corresponding to the energy required for driving the pump. Therefore, it can be said that the larger the amount of $CO_2$ reduction, the more efficiently $CO_2$ is recovered at the $CO_2$ recovery device 21. The solid line in the figure shows the relationship when the $CO_2$ concentration in the gas supplied to the $CO_2$ recovery device 21 is high, while the broken line in the figure shows the relationship when this $CO_2$ concentration is low.

Figure 4:
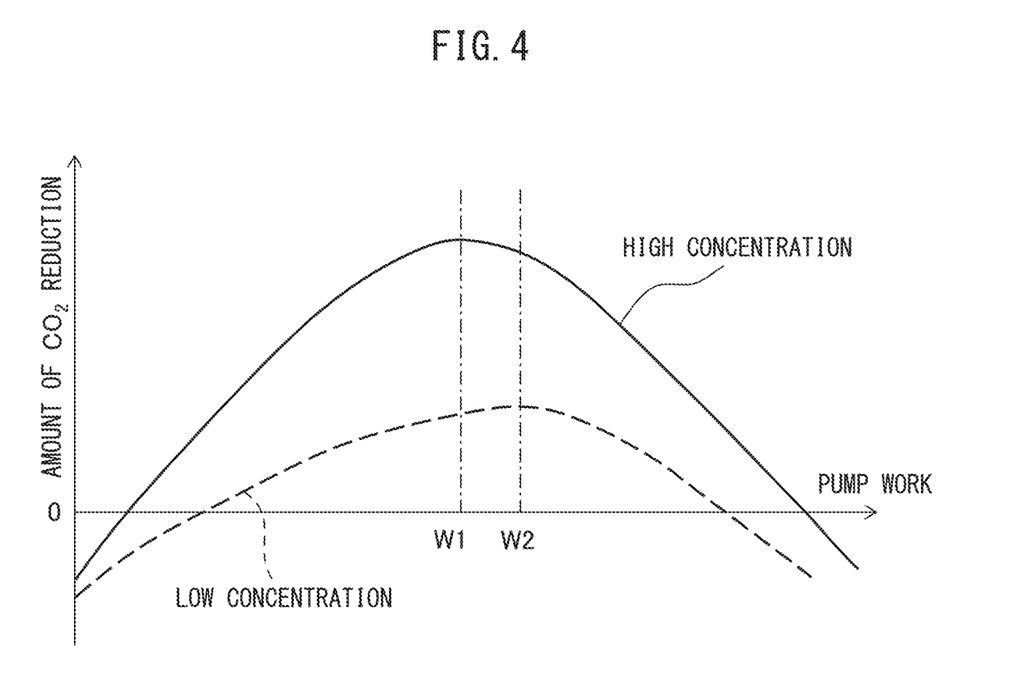
FIG. 4 is a view showing a relationship between pump work performed by a suction pump and an amount of $CO_2$ reduction.

As shown in FIG. 4, when the pump work of the suction pump 23 is small, the flow rate of gas flowing into the $CO_2$ recovery device 21 is small, therefore the amount of $CO_2$ recovery at the $CO_2$ recovery device 21 is small. As a result, in a region with a small pump work, the amount of $CO_2$ reduction is small. On the other hand, when the pump work of the suction pump 23 is large, the flow resistance at the $CO_2$ recovery device 21 is large and the flow rate of gas flowing through the $CO_2$ recovery device 21 is small with respect to the magnitude of the pump work. As a result, even in a region with large pump work, the amount of $CO_2$ reduction is small. On the other hand, in a region with an intermediate extent of the magnitude of the pump work, the flow rate of the gas flowing into the $CO_2$ recovery device 21 is large and the flow resistance is small, therefore the amount of $CO_2$ reduction is great.

In this regard, the magnitude of the pump work where the amount of $CO_2$ reduction is maximum, changes according to the $CO_2$ concentration in the gas. In the illustrated example, when the $CO_2$ concentration is high, the amount of $CO_2$ reduction is maximum when the pump work is W1. On the other hand, when the $CO_2$ concentration is low, the amount of $CO_2$ reduction is maximum when the pump work is W2.

Therefore, in the present embodiment, the output of the suction pump 23 is set based on the $CO_2$ concentration in the gas supplied to the $CO_2$ recovery device 21. Specifically, if there is the relationship such as shown in FIG. 4, when the $CO_2$ concentration is relatively high, the output of the suction pump 23 is controlled so that the pump work is relatively low. By controlling the suction pump 23 in this way, it is possible to efficiently recover the $CO_2$ at the $CO_2$ recovery device 21.

Further, in the present embodiment, when the flow path switching device 22 is set to the outside connection position, the suction pump 23 is controlled so that its output becomes lower as the running speed of the vehicle 1 becomes faster.

In this regard, as explained above, when the flow path switching device 22 is set to the outside connection position, if the vehicle 1 is running, outside air is forcibly made to flow to the outside connection passage 33. Therefore, even if the output of the suction pump 23 is made smaller, a large amount of air can be supplied to the $CO_2$ recovery device 21. Therefore, it is possible to reduce the pump work at the suction pump 23 while maintaining the amount of recovery of $CO_2$ at the $CO_2$ recovery device 21.

Figure 5:
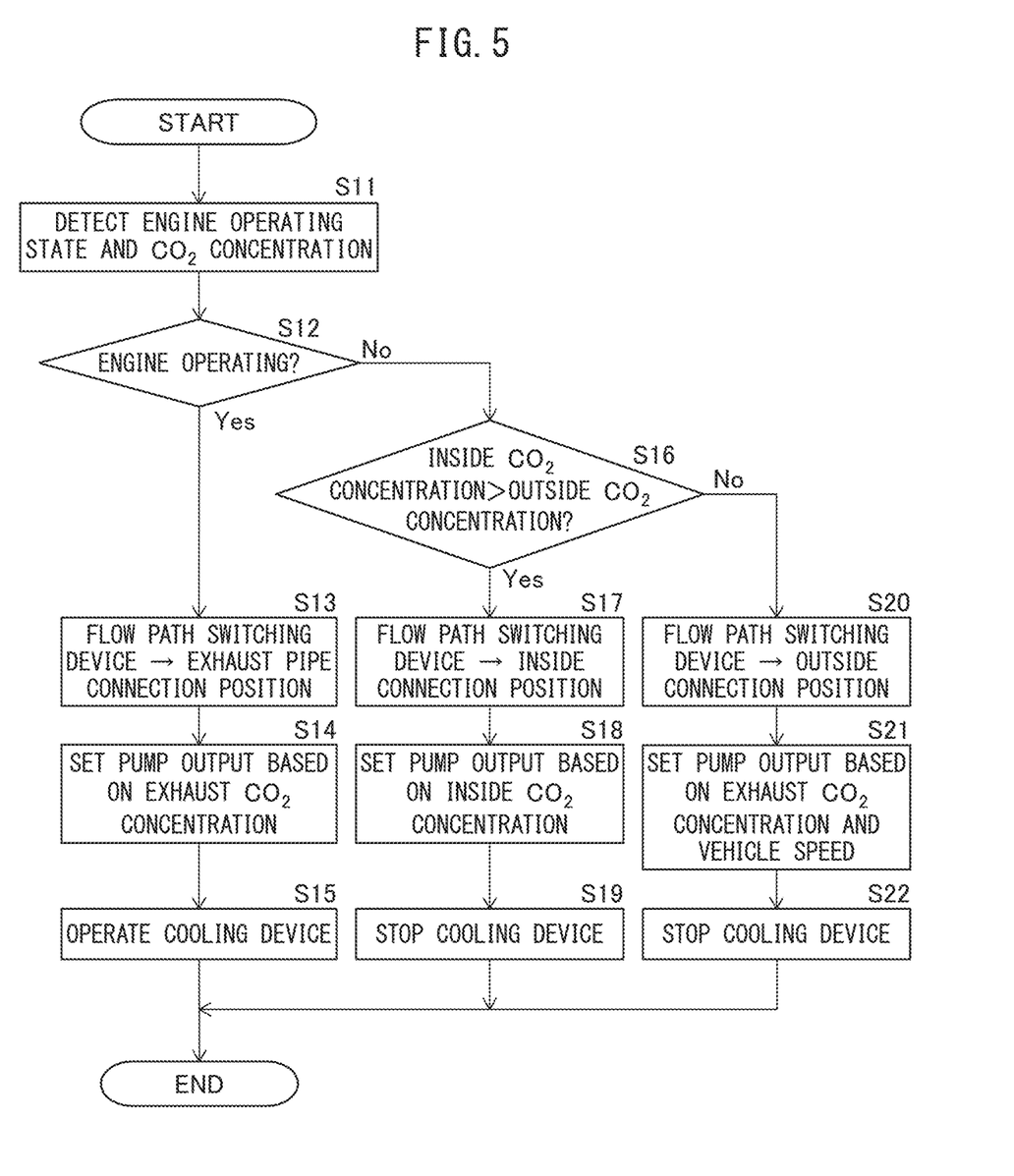
FIG. 5 is a flow chart showing a control routine in control in the $CO_2$ recovery system.

FIG. 5 is a flow chart showing a control routine in control in the $CO_2$ recovery system 20. The illustrated control routine is performed every certain time interval.

First, at step S11, the operating state of the internal combustion engine and the $CO_2$ concentrations in the gases at a plurality of different regions of the vehicle 1 are detected, based on the outputs of various sensors. Next, at step S12, it is judged if the internal combustion engine 10 is being operated. For example, if the current engine rotational speed calculated based on the output of the crank angle sensor 45 is zero, it is judged that the internal combustion engine 10 has stopped. When it is not zero, it is judged that the internal combustion engine 10 is being operated. At step S12, if it is judged that the internal combustion engine 10 is being operated, the control routine proceeds to step S13.

At step S13, the flow path switching device 22 is set to the exhaust pipe connection position. Next, at step S14, the output of the suction pump 23 is set based on the $CO_2$ concentration in the gas flowing through the exhaust pipe connection passage 32 to the $CO_2$ recovery device 21. The $CO_2$ concentration is calculated based on the output of the air-fuel ratio sensor 43. As the air-fuel ratio of the air-fuel ratio sensor 43 is larger (leaner), the calculated $CO_2$ concentration is smaller. Next, at step S15, the cooling device 24 is operated and the temperature of the exhaust gas flowing into the flow path switching device 22 is lowered.

On the other hand, if, at step S12, it is judged that the internal combustion engine 10 is not operating, the control routine proceeds to step S16. At step S16, it is judged if the $CO_2$ concentration at the inside of the vehicle 1 is higher than the $CO_2$ concentration at the outside of the vehicle 1. The $CO_2$ concentration at the inside of the vehicle 1 is detected by the inside $CO_2$ concentration sensor 42, while the $CO_2$ concentration at the outside of the vehicle 1 is detected by the outside $CO_2$ concentration sensor 41.

If, at step S16, it is judged that the $CO_2$ concentration at the inside of the vehicle 1 is higher than the $CO_2$ concentration at the outside of the vehicle 1, the control routine proceeds to step S17. At step S17, the flow path switching device 22 is set to the inside connection position. Next, at step S18, the output of the suction pump 23 is set based on the $CO_2$ concentration at the inside of the vehicle 1. Accordingly, the flow rate of air at the inside of the vehicle 1 flowing into the $CO_2$ recovery device 21 is controlled based on the $CO_2$ concentration at the inside of the vehicle 1. Next, at step S19, the cooling device 24 is stopped.

On the other hand, if, at step S16, it is judged that the $CO_2$ concentration at the inside of the vehicle 1 is equal to or greater than the $CO_2$ concentration of the outside of the vehicle 1, the control routine proceeds to step S20. At step S20, the flow path switching device 22 is set to the outside connection position. Next, at step S21, the output of the suction pump 23 is set based on the $CO_2$ concentration at the outside of the vehicle 1 and the speed of the vehicle 1. Accordingly, the flow rate of the air at the outside of the vehicle 1 flowing into the $CO_2$ recovery device 21 is controlled, based on the $CO_2$ concentration at the outside of the vehicle 1 and the speed of the vehicle 1. The speed of the vehicle 1 is detected by the vehicle speed sensor 44. Next, at step S22, the cooling device 24 is stopped.

Second Embodiment

Next, referring to FIG. 6, the $CO_2$ recovery system according to a second embodiment will be explained. The configuration and control of the $CO_2$ recovery system according to the second embodiment are basically similar to the configuration and control of the $CO_2$ recovery system according to the first embodiment. Below, the parts different from the first embodiment will be focused on in the explanation.

Figure 6:
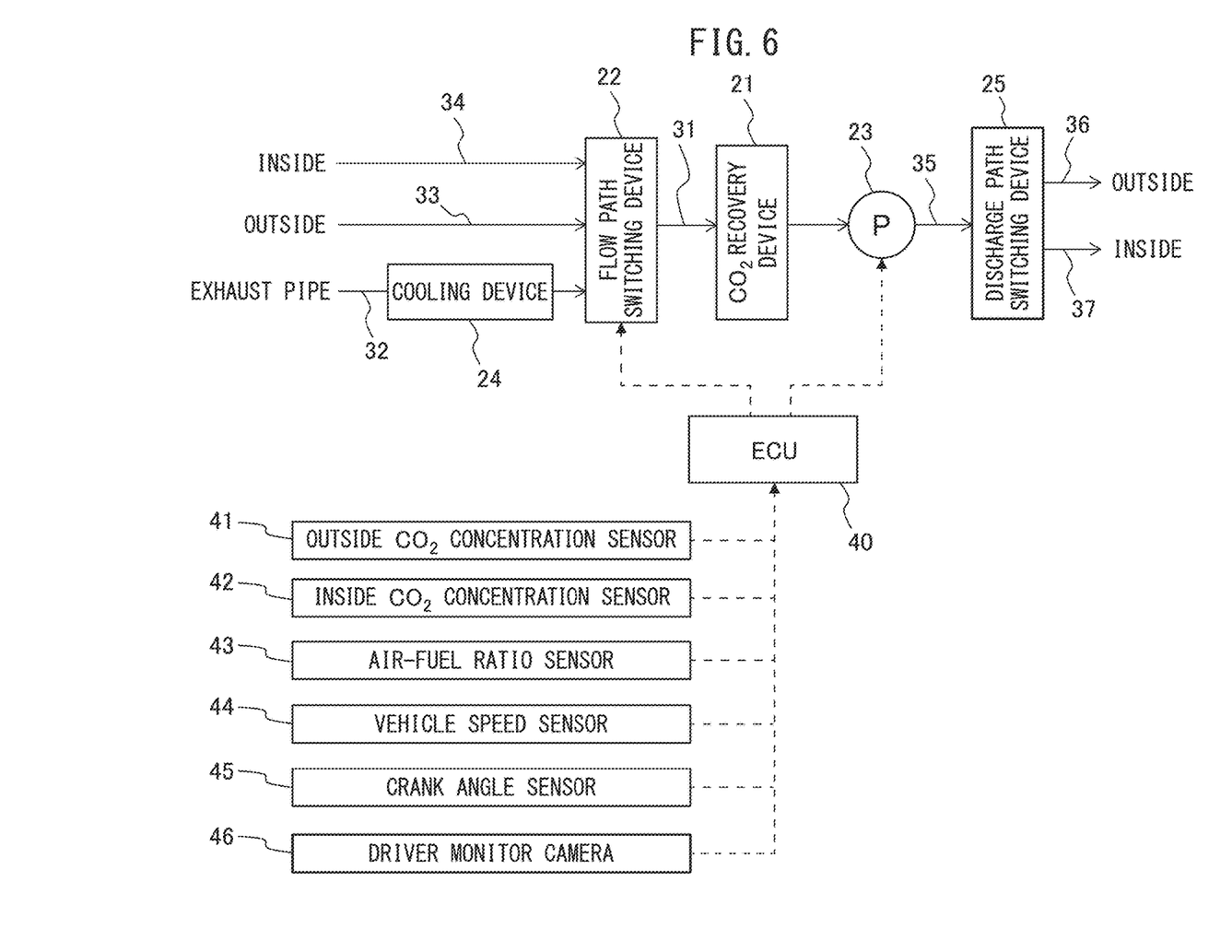
FIG. 6 is a view schematically explaining the configuration of a $CO_2$ recovery system according to a second embodiment.

FIG. 6 is a view schematically explaining the configuration of a $CO_2$ recovery system 20 according to the second embodiment. As shown in FIG. 6, the $CO_2$ recovery system 20 has a discharge path switching device 25 and driver monitor camera 46, in addition to the components in the first embodiment.

The discharge path switching device 25 communicates through the exhaust passage 35 with the $CO_2$ recovery device 21. Therefore, the gas discharged from the $CO_2$ recovery device 21 flows into the discharge path switching device 25. Further, the discharge path switching device 25 communicates through the release passage 36 to the outside of the vehicle 1 and communicates through the return passage 37 to the inside of the vehicle 1.

The discharge path switching device 25 makes one passage among the release passage 36 and the return passage 37 be selectively communicated with the exhaust passage 35. Therefore, the discharge path switching device 25 selectively discharges the gas discharged from the $CO_2$ recovery device 21 to one of the outside and inside of the vehicle 1.

The driver monitor camera 46, for example, is arranged on the top surface of a steering column cover and captures an image of the face of the driver. The output signals of the driver monitor camera 46 is input to the ECU 40.

The ECU 40 calculates the degree of awakeness of the driver based on the image of the face of the driver sent from the driver monitor camera 46. The degree of awakeness of the driver is, for example, calculated considering the degrees of opening of the eyes of the driver, the orientation of the face of the driver, movement of the eyes and face of the driver, etc. Alternatively, the degree of awakeness of the driver is calculated using a neural network learned based on the image of the face of the driver. A low degree of awakeness of the driver expresses major sleepiness of the driver, a drop in concentration, etc. Note that, the degree of awakeness of the driver may also be calculated based on equipment other than the driver monitor camera.

Inn general, it is known that if in an environment of a high $CO_2$ concentration, drowsiness is induced and concentration is decreased. That is, when the degree of awakeness of the driver is low, the cause is believed to be a high $CO_2$ concentration at the inside of the vehicle 1.

Therefore, in the present embodiment, when the degree of awakeness of the driver calculated based on the output of the driver monitor camera 46 is lower than a predetermined reference value, the flow path switching device 22 is set to the inside connection position. Due to this, the air at the inside of the vehicle 1 is supplied to the $CO_2$ recovery device 21. In addition, the discharge path switching device 25 is set to a return position making the exhaust passage 35 communicate with the return passage 37. Due to this, the gas discharged from the $CO_2$ recovery device 21 is returned to the inside of the vehicle 1. As a result, gas from which $CO_2$ has been recovered at the $CO_2$ recovery device 21 and at which the $CO_2$ concentration has been lowered, is returned to the inside of the vehicle 1. Therefore, it is possible to keep the $CO_2$ concentration at the inside of the vehicle 1 low.

Figure 7:
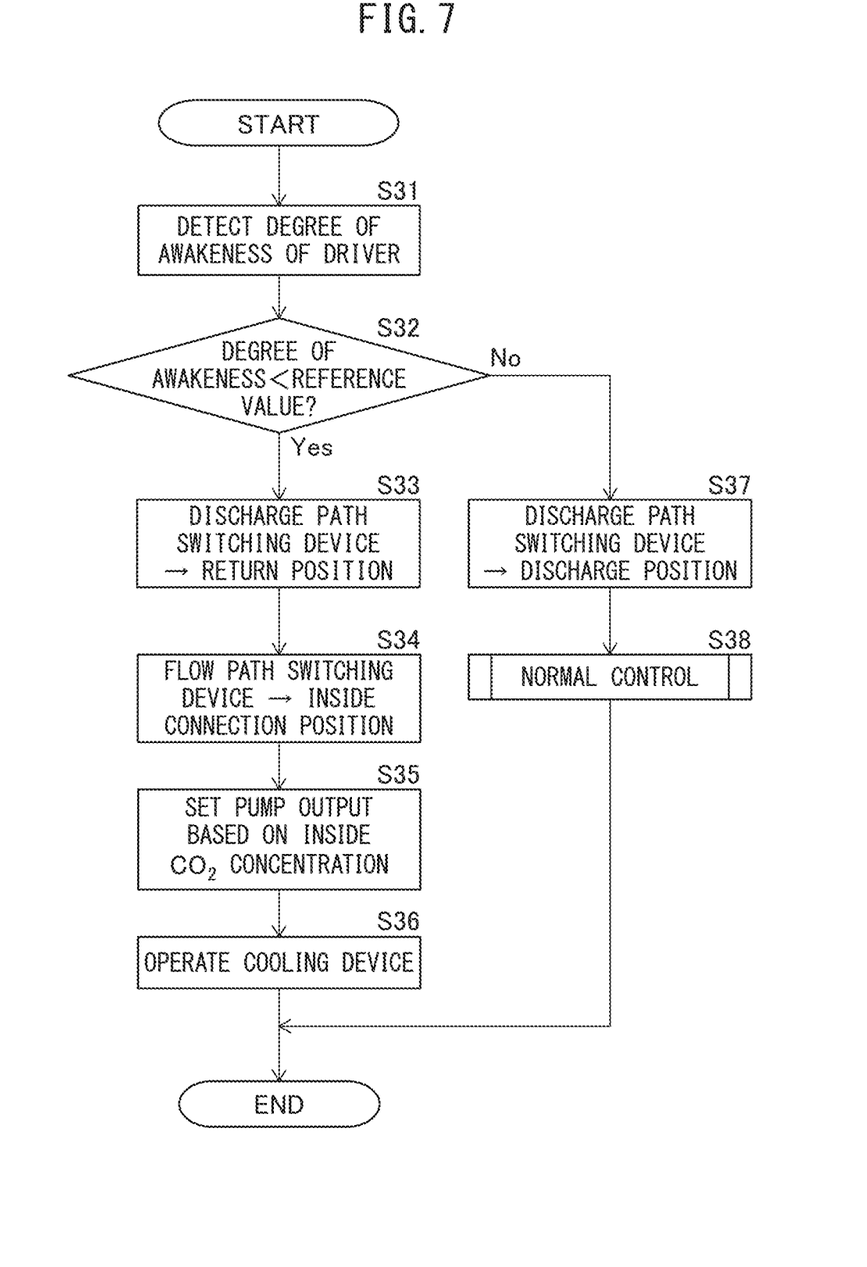
FIG. 7 is a flow chart showing a control routine in control in the $CO_2$ recovery system.

FIG. 7 is a flow chart showing a control routine in control in the $CO_2$ recovery system 20. The illustrated control routine is performed every certain time interval.

First, at step S31, the degree of awakeness of the driver is calculated at the ECU 40 based on the output of the driver monitor camera 46, etc. Next, at step S32, it is judged if the degree of awakeness detected at step S31 is lower than a predetermined reference value, that is, if the concentration of the driver is falling. If, at step S32, it is judged that the degree of awakeness of the driver is lower than the reference value, the control routine proceeds to step S33.

At step S33, the discharge path switching device 25 is set to the return position. Next, at step S34, the flow path switching device 22 is set to the inside connection position. Next, at step S35, the output of the suction pump 23 is set based on the $CO_2$ concentration at the inside of the vehicle 1. Accordingly, the flow rate of air at the inside of the vehicle 1 flowing to the $CO_2$ recovery device 21 is controlled based on the $CO_2$ concentration at the inside of the vehicle 1. Next, at step S36, the cooling device 24 is stopped.

On the other hand, if, at step S32, it is judged that the degree of awakeness of the driver is equal to or greater than the reference value, the control routine proceeds to step S37. At step S37, the discharge path switching device 25 is set to a release position making the exhaust passage 35 communicate with the release passage 36. Next, at step S38, the normal control shown in FIG. 5 is performed.

Above, preferred embodiments according to the present invention were explained, but the present invention is not limited to these embodiments and may be modified and changed in various ways within the language of the claims.

REFERENCE SIGNS LIST 1 vehicle
10 internal combustion engine
11 engine body
12 exhaust pipe
20 $CO_2$ recovery system
21 $CO_2$ recovery device
22 flow path switching device
23 suction pump
24 cooling device

The invention claimed is:

1. A $CO_2$ recovery system used in a vehicle, comprising:
   a $CO_2$ recovery device recovering $CO_2$ contained in inflowing gas; and
   a flow rate control device controlling flow rates of gases present in a plurality of different regions of the vehicle flowing into the $CO_2$ recovery device,
   wherein the gases present at the plurality of different regions include at least any two among air at an outside of the vehicle, air at an inside of the vehicle, and exhaust gas discharged from a body of an internal combustion engine of the vehicle,
   the flow rate control device has a switching device arranged at an upstream side of the $CO_2$ recovery device in a direction of flow of the gas and a pump forcibly sending gases from a plurality of different regions through the switching device to the $CO_2$ recovery device,
   the switching device switches the gas to be flowed to the $CO_2$ recovery device among the gases present in the plurality of different regions,
   the vehicle has an internal combustion engine having the body of the internal combustion engine and an exhaust passage through which exhaust gas discharged from the body of the internal combustion engine flows,
   the gases present at the plurality of different regions include exhaust gas discharged from the body of the internal combustion engine, and
   the switching device communicates with the exhaust passage so that exhaust gas can flow to the switching device from the exhaust passage.

2. The $CO_2$ recovery system according to claim 1, wherein the flow rate control device controls the flow rate of air at the outside of the vehicle flowing into the $CO_2$ recovery device, based on a $CO_2$ concentration in the air at the outside of the vehicle.

3. The $CO_2$ recovery system according to claim 1, wherein the flow rate control device controls the flow rate of air at the inside of the vehicle flowing into the $CO_2$ recovery device, based on a $CO_2$ concentration in the air at the inside of the vehicle.

4. The $CO_2$ recovery system according to claim 1, wherein
   a first connection passage communicating the exhaust passage with the switching device is provided with a cooling device cooling the gas, and
   a second connection passage communicating an outside of the vehicle with the switching device and a third connection passage communicating an inside of the vehicle with the switching device are not provided with cooling devices.

5. The $CO_2$ recovery system according to claim 1, wherein a communication path communicating the switching device with the $CO_2$ recovery device is provided with a cooling device cooling gas flowing through the communication path.

6. The $CO_2$ recovery system according to claim 1, wherein the flow rate control device controls the flow rate of the exhaust gas, which is discharged from the body of the internal combustion engine, flowing into the $CO_2$ recovery device, based on the $CO_2$ concentration in the exhaust gas flowing through the exhaust passage.

7. The $CO_2$ recovery system according to claim 1, wherein the flow rate control device is controlled so that when the internal combustion engine is stopped, at least one of air at the outside of the vehicle and air at the inside of the vehicle, flows into the $CO_2$ recovery device.

8. The $CO_2$ recovery system according to claim 1, wherein when the flow rate control device is controlled so that air at the outside of the vehicle flows into the $CO_2$ recovery device, the pump is controlled so that an output of the pump decreases, as the a running speed of the vehicle becomes faster.

9. The $CO_2$ recovery system according to claim 1, wherein
   the system further comprises an awakeness degree detection device for detecting a degree of awakeness of a driver,
   the $CO_2$ recovery device is configured to be able to return gas discharged from the $CO_2$ recovery device to the inside of the vehicle, and
   when a degree of awakeness of the driver is lower than a predetermined threshold value, the flow rate control device is controlled so that the air at the inside of the vehicle flows into the $CO_2$ recovery device and the gas discharged from the $CO_2$ recovery device is returned to the inside of the vehicle.

* * * * *